United States Patent
Mejias Miranda (10) Patent No.: US 7,324,685 B2
(45) Date of Patent: Jan. 29, 2008

(54) INSPECTION SYSTEMS AND METHODS (75) Inventor: Jose M. Mejias Miranda, Aguadilla, PR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 822 days.

(21) Appl. No.: 10/689,410

(22) Filed: Oct. 20, 2003

(65) Prior Publication Data
US 2005/0084148 A1 Apr. 21, 2005

(51) Int. Cl.
G06K 9/00 (2006.01)
(52) U.S. Cl. ............... 382/147; 382/146; 382/149
(58) Field of Classification Search ............... 382/141, 382/145–148
See application file for complete search history.

(56) References Cited

U.S. PATENT DOCUMENTS 5,924,192 A * 7/1999 Wuyts .................... 29/833
6,098,275 A * 8/2000 Wuyts et al. ............ 29/741

FOREIGN PATENT DOCUMENTS

JP 2001-280935 * 10/2001

* cited by examiner

Primary Examiner—Vikkram Bali (57) ABSTRACT

In one embodiment, a system comprises logic configured to identify a tip of a pin that has been press fit into a circuit board, logic configured to measure characteristics that pertain to a flat end surface and a chamfered surface of the identified pin tip, logic configured to compare the measured characteristics with at least one of stored reference values and each other, and logic configured to make a final decision as to whether the pin is properly installed based upon results of the comparing performed by the logic configured to compare.

41 Claims, 11 Drawing Sheets

INSPECTION SYSTEMS AND METHODS

BACKGROUND

Computing devices such as personal computers (PCs) typically include one or more printed circuit boards (PCBs) on which various components are mounted. Traditionally, such components are mounted to PCBs using surface mount technology in which the components are secured to the PCB using solder paste. More recently, press-fit technology has been developed through which pins, either those of a given component or individually, are pressed into a PCB using a large force, such as several tons.

Figure 1A:
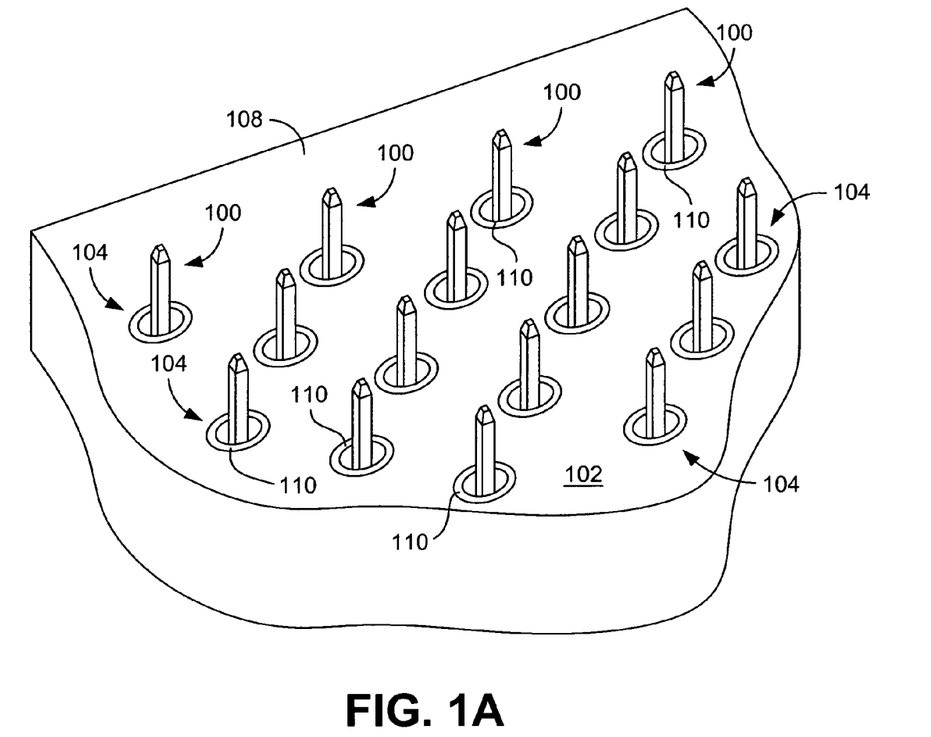
FIG. 1A is a perspective view of connector pins that have been press fit into a printed circuit board.
Figure 1B:
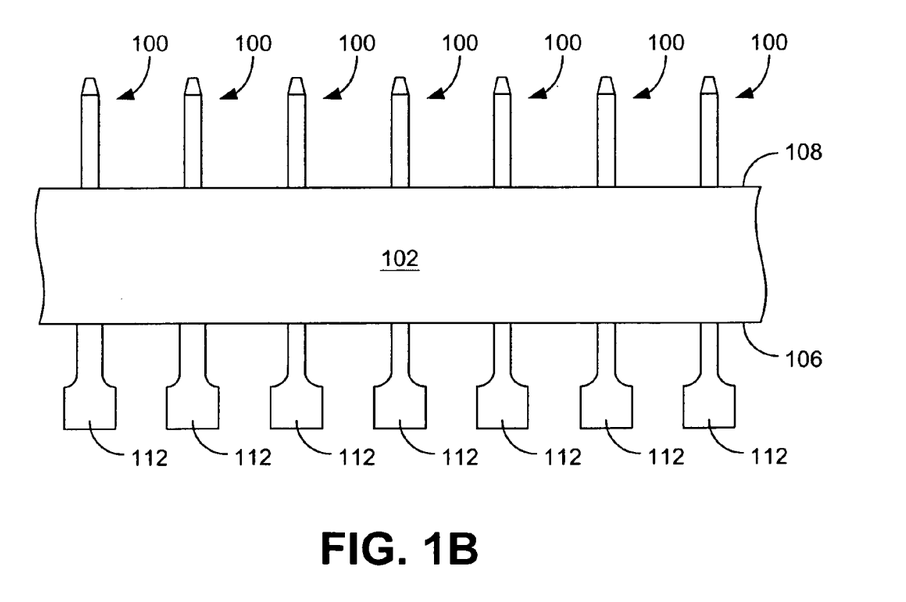
FIG. 1B is a side view of the connector pins and printed circuit board of FIG. 1A.

FIGS. 1A and 1B illustrate an example of press fitting of individual connector pins 100 into a PCB 102. As is depicted in those figures, the pins 100 are passed through holes 104, called through holes, that extend from a bottom side 106 of the PCB 102 to a top side 108 of the PCB. The through holes 104 often comprise metal barrels 110 that extend along the length of the holes. The pins 100 are held in place within the barrels 110 by deformable portions of the pins (not shown) that are inwardly compressed when the pins are pressed into the PCB 102 from the bottom side of the PCB using base portions 112 of the pins.

It is common to inspect the connection of components to a PCB during manufacturing to ensure that the various components are correctly mounted to the PCB. One common inspection method is two-dimensional automatic optical inspection (AOI) in which machine vision techniques are used to analyze the connection of the components to the PCB. Although two-dimensional AOI is reasonably effective for inspecting the connection of components that have been attached to the PCB using surface mount technology, AOI is less effective for inspecting press-fit connections. The reason for this is that, for a proper connection, a pin must protrude a given distance beyond the top surface of the PCB (see FIGS. 1A and 1B). AOI techniques, however, only employ two-dimensional viewing from a position directly above the PCB. Therefore, AOI cannot distinguish between a pin that correctly protrudes from its through hole, and a pin that is wholly contained within the through hole (e.g., due to crimping or folding of the pin within the through hole). Moreover, it is possible for AOI techniques to falsely indicate a proper press-fit connection even when a pin is not contained within a through hole by mistakenly identifying the through hole barrel as a pin.

Although proper mounting of a press-fit connector pin could be confirmed using three-dimensional inspection equipment (e.g., three-dimensional AOI), such equipment is undesirably complex. For example, to properly inspect a pin in three dimensions, such equipment may require as many as five cameras, one camera positioned directly above the pin and four cameras placed at various lateral positions around the perimeter of the pin. In addition to the expense of such equipment, complex software must be used to coordinate and analyze all of the data collected by the three-dimensional inspection equipment.

From the above, it can be appreciated that it would be desirable to have a system and method for effectively inspecting press-fit connections that does not require three-dimensional inspection equipment.

SUMMARY

Disclosed are inspection systems and methods. In one embodiment, a system comprises logic configured to identify a tip of a pin that has been press fit into a circuit board, logic configured to measure characteristics that pertain to a flat end surface and a chamfered surface of the identified pin tip, logic configured to compare the measured characteristics with at least one of stored reference values and each other, and logic configured to make a final decision as to whether the pin is properly installed based upon results of the comparing performed by the logic configured to compare.

In another embodiment, a system comprises a camera adapted to capture images, a first lighting source that is configured to illuminate an object from a first direction, a second lighting source that is configured to illuminate the object from a second direction, and an image analysis system configured to control the camera so as to capture a first image of the object when illuminated by the first lighting source and capture a second image of the object when illuminated by the second lighting source, the image analysis system further being configured to measure characteristics of the object and compare the measured characteristics with at least one of stored reference values and each other for purposes of making a final decision as to the object.

In one embodiment, a method comprises capturing an image of a circuit board location at which a pin is to have been press-fit, identifying a feature in a captured image that may comprise a tip of the pin, measuring characteristics that pertain to particular features of the identified pin tip, comparing the measured characteristics with at least one of stored reference values and each other, and making a final decision as to whether the press-fit connection is acceptable based upon results of the comparing.

BRIEF DESCRIPTION OF THE DRAWINGS

The disclosed systems and methods can be better understood with reference to the following drawings. The components in the drawings are not necessarily to scale.

DETAILED DESCRIPTION

Disclosed are inspection systems and methods, including systems and methods for inspecting circuit board connections, such as press-fit pin connections. As is described in greater detail below, the systems and methods employ a single camera that captures light reflected from a connector pin (or through hole in which a pin was supposed to have been installed) from multiple angles for the purpose of detecting and analyzing features of the pin tip so that a final determination may be made as to whether the press-fit connection is acceptable or unacceptable (i.e., defective). In some embodiments, image data pertaining to the flat pin surface and the chamfered surfaces of the pin are collected (when present) and analyzed relative to reference data pertaining to a properly-installed pin. Pins whose orientation indicated by the image data differs from the reference data beyond predetermined thresholds may be identified as defective. Although the discussions that follow are specifically directed at press-fit pins, the disclosed systems and methods could, however, be adapted to inspect other features. Accordingly, the disclosed systems and methods more generally comprise systems and methods for inspecting connection of an element to a circuit board (or other member).

Figure 2:
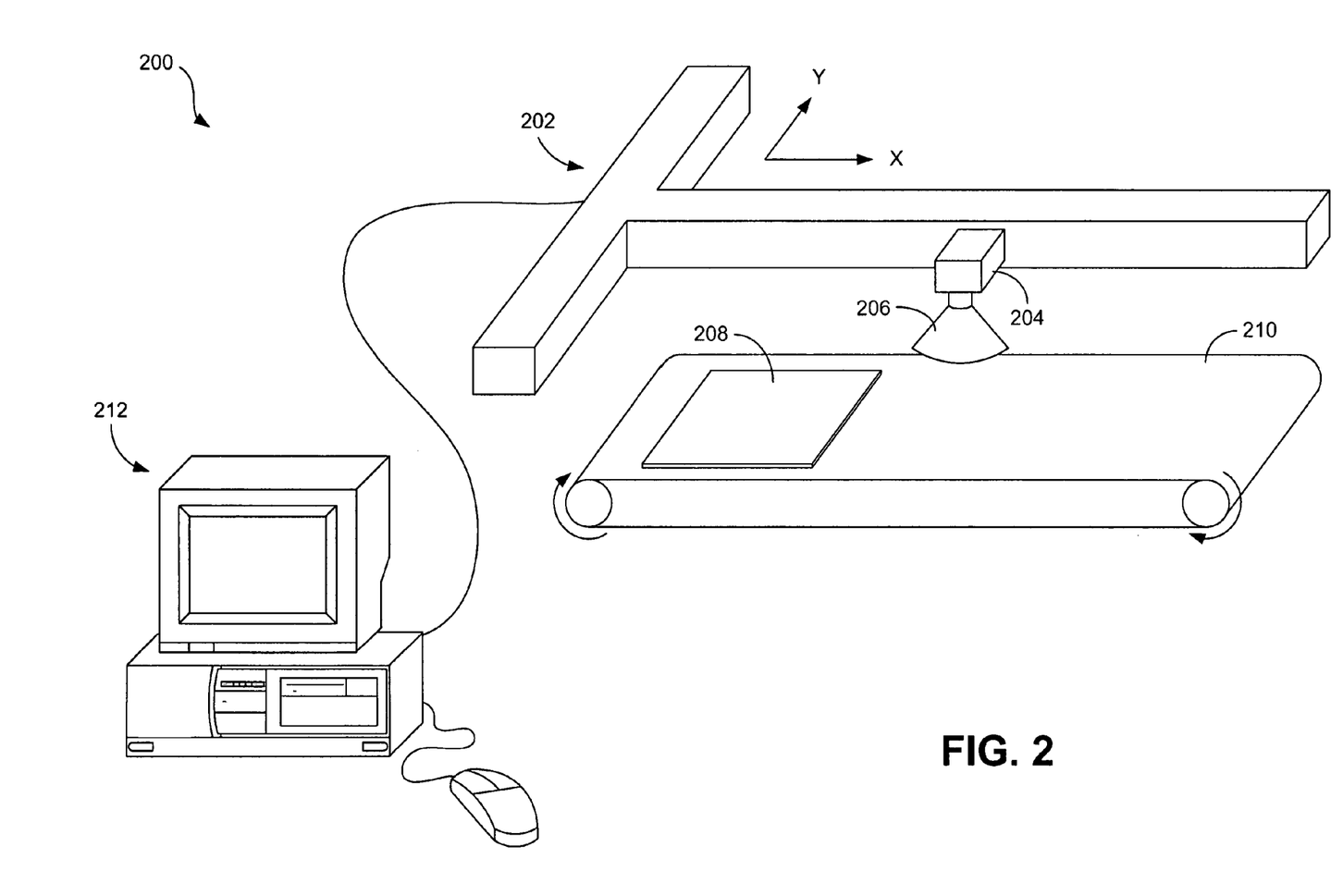
FIG. 2 is a schematic view of an embodiment of a system for inspecting press-fit connections.

Referring now in more detail to the drawings, in which like numerals indicate corresponding parts throughout the several views, FIG. 2 illustrates a press-fit connection inspection system 200. As shown in the figure, the inspection system 200 includes a two dimensional manipulator 202 that is configured to displace a camera 204 in x and y directions. The camera 204 comprises an analog or a digital camera and, by way of example, comprises a charge-coupled device (CCD). Attached to the camera 204 is a lighting head 206 that, as is described in greater detail below, is configured to shine light on a printed circuit board (PCB) 208, which comprises at least one press-fit connection, in at least two different directions. In some embodiments, the light head 206 is configured to shine light on the PCB 208 from both a nearly perpendicular direction and a nearly parallel direction. The PCB 208 is displaced by a conveying mechanism, depicted by a conveyor 210, that positions the PCB below the light head 206 and camera 204. The manipulator 202 is controlled by a computing device 212, such as a personal computer (PC).

Figure 3:
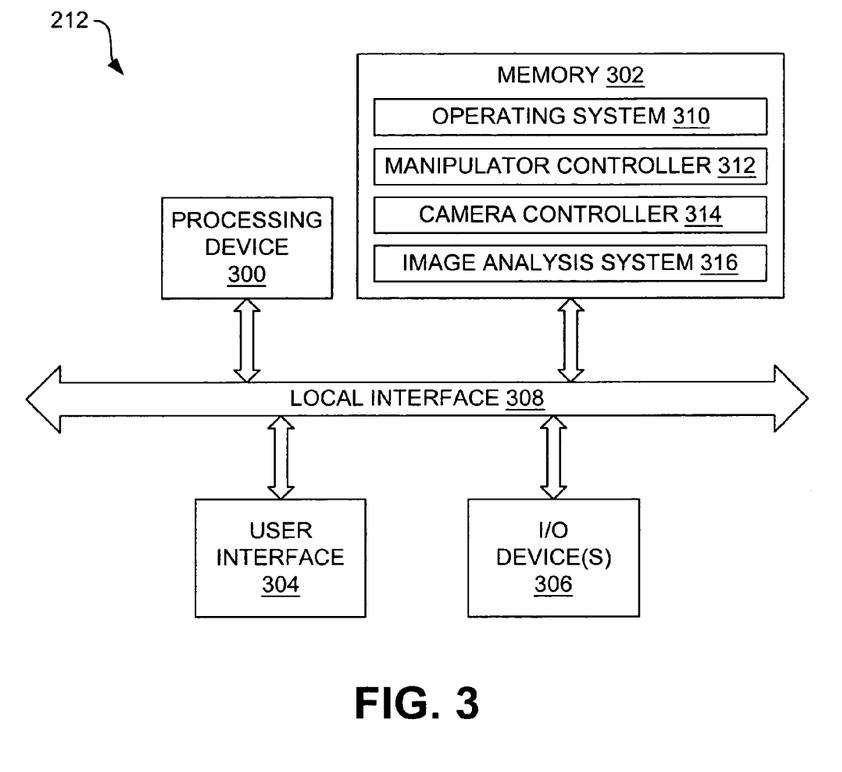
FIG. 3 is a block diagram of an embodiment of a computing device of the system shown in FIG. 2.

FIG. 3 illustrates an embodiment for the computing device 212 shown in FIG. 2. As indicated in FIG. 3, the computing device 212 comprises a processing device 300, memory 302, a user interface 304, and at least one input/output I/O device 306, each of which is connected to a local interface 308.

The processing device 300 can include a central processing unit (CPU) or an auxiliary processor among several processors associated with the computing device 212, or a semiconductor-based microprocessor (in the form of a microchip). The memory 302 includes any one of or a combination of volatile memory elements (e.g., RAM) and nonvolatile memory elements (e.g., read only memory (ROM), hard disk, etc.).

The user interface 304 comprises the components with which a user, such as a system operator, interacts with the computing device 212, such as a keyboard and mouse, and a device that provides visual information to the user, such as a cathode ray tube (CRT) or liquid crystal display (LCD) monitor.

With further reference to FIG. 3, the one or more I/O devices 306 are adapted to facilitate communication with other devices. By way of example, the I/O devices 306 include one or more of a universal serial bus (USB) or a small computer system interface (SCSI) connection component, and/or network communication components such as a modem or a network card.

The memory 302 comprises various programs including an operating system 310, a manipulator controller 312, a camera controller 314, and an image analysis system 316. The operating system 310 controls the execution of other programs and provides scheduling, input-output control, file and data management, memory management, and communication control and related services. The manipulator controller 312 is configured to control displacement of the manipulator 202 (FIG. 2) and, therefore, the position of the camera 204. The camera controller 314 is configured to control operation of the camera 204 as well as the lighting head 206. Finally, the image analysis system 316 is configured to analyze images captured by the camera 202 and, ultimately, make a final determination as to the adequacy of a press-fit connection.

Various programs (ie., logic) have been described herein. These programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 4:
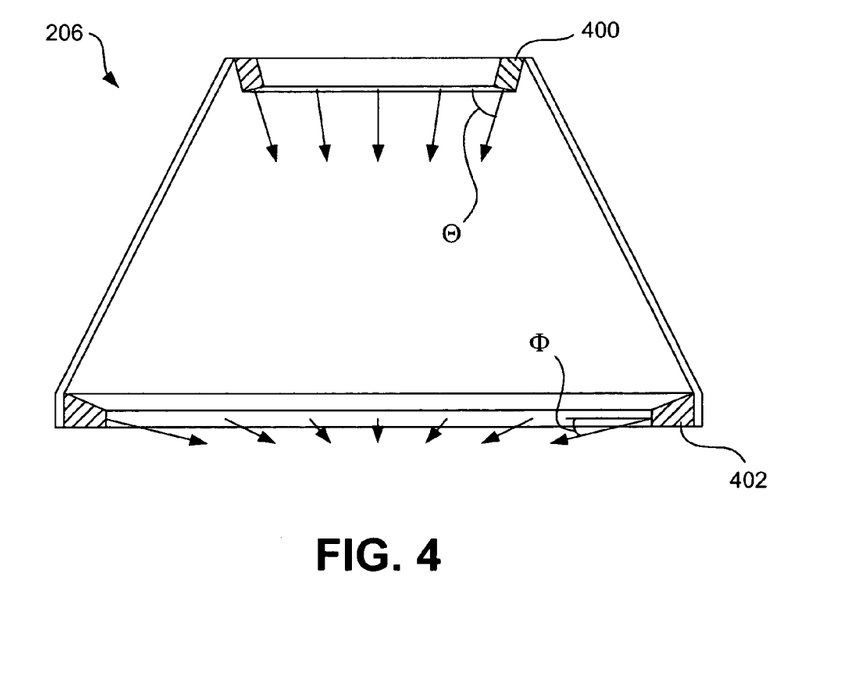
FIG. 4 is a schematic cross-sectional view of a lighting head of the system shown in FIG. 2 and illustrates light sources used to illuminate connector pins.

FIG. 4 is a cross-sectional view that illustrates the lighting head 206 (FIG. 2) in greater detail. As is indicated in FIG. 4, the lighting head 206 comprises first and second light sources 400 and 402 that are adapted to shine light on a PCB, and its press-fit pins, for purposes of capturing images with the camera 202. The first light source 400 is adapted to shine light nearly perpendicular to the PCB. Therefore, as indicated in FIG. 4, the first light source 400 is adapted to shine light at an angle, $\Theta$, relative to horizontal (i.e., a plane that is parallel to the plane of the PCB). By way of example, that angle is approximately 60 to 90 degrees. For instance, $\Theta$ may be equal to approximately 70 degrees. The second light source 402 is adapted to shine light nearly parallel to the PCB. Therefore, as indicated in FIG. 4, the second light source 402 is adapted to shine light at an angle, $\Phi$, relative to horizontal (i.e., a plane that is parallel to the plane of the PCB). By way of example, that angle comprises approximately 10 to 45 degrees. For instance, $\Phi$ may be equal to approximately 15 degrees.

Each light source 400, 402 may comprise one or more light-emitting elements. By way of example, each light source 400, 402 comprises at least one laser emitting diode (LED) (not shown) that is capable of emitting focused light in a particular direction. As is further depicted in the cross-sectional view of FIG. 4, each light source 400, 402 is configured to shine light from around the entire circumference of the lighting head 206. Therefore, images of a pin under inspection may be captured from the entire periphery of the pin. Optionally, different color light may be emitted from the two light sources 400, 402. Although not necessary for computer inspection of the press-fit connections, different colors may be useful to the operator when observing composite images of a pin tip (see below for a discussion of composite images).

Figure 5:
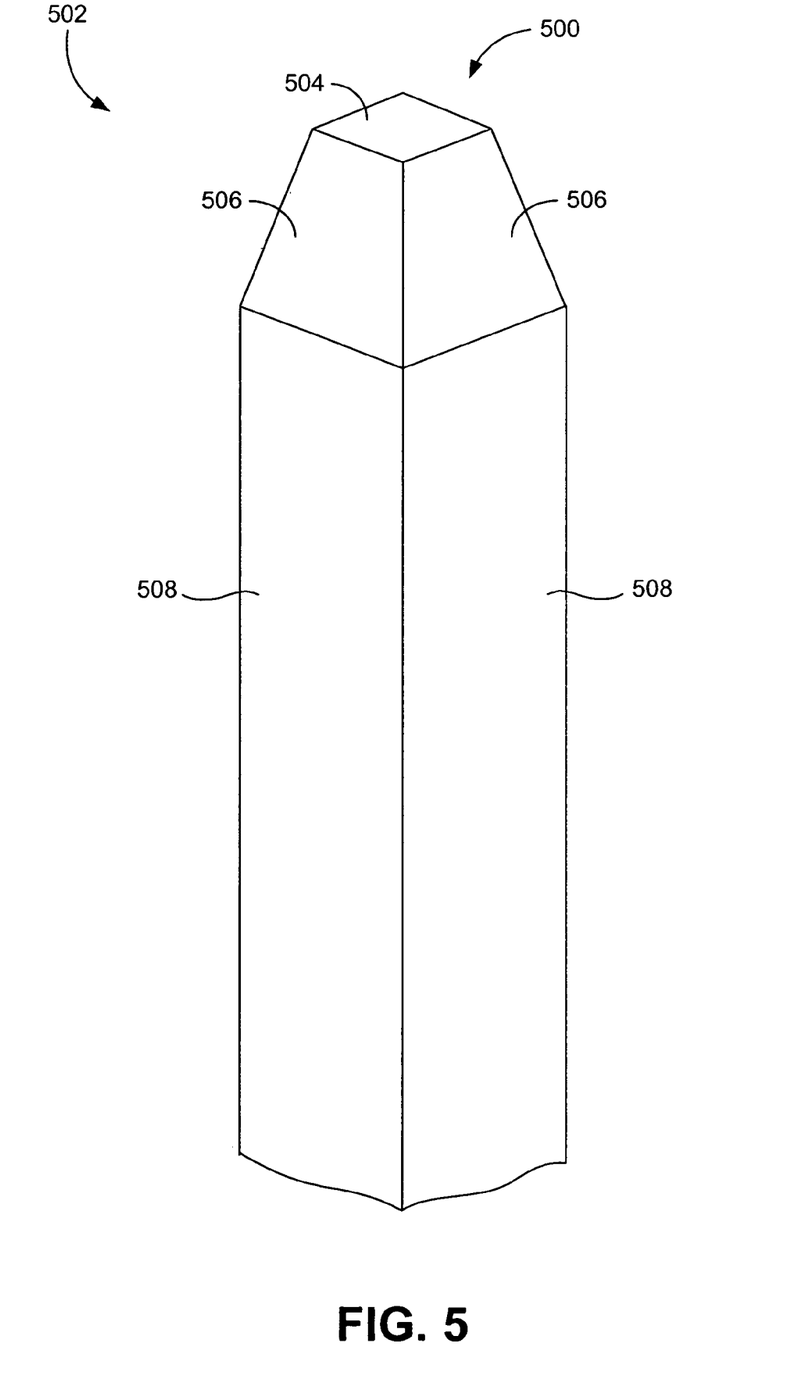
FIG. 5 is a partial perspective view of a connector pin illustrating a flat end surface of the pin and chamfered surfaces of the pin adjacent the flat end surface.

FIG. 5 provides an enlarged view of the tip 500 of an example connector pin 502. The connector pin 502 may comprise an individual, i.e., independent, pin, or may comprise a pin of a given component that is to be mounted to a PCB. In either case, the pin tip 500 comprises a flat end surface 504, and at least one chamfered surface 506 that is adjacent the flat end surface. In the embodiment illustrated in FIG. 5, the pin tip 500 comprises four chamfered surfaces 506 (only two visible in FIG. 5). Alternatively, however, a tip of a connector pin may comprise two opposed chamfered surfaces. As is described below, the number of chamfered surfaces comprised by a given pin is not critical to the inspection process. Below the chamfered surfaces 506 are lateral sides 508 of the pin 502 that extend along the length of the pin.

Figure 6A:
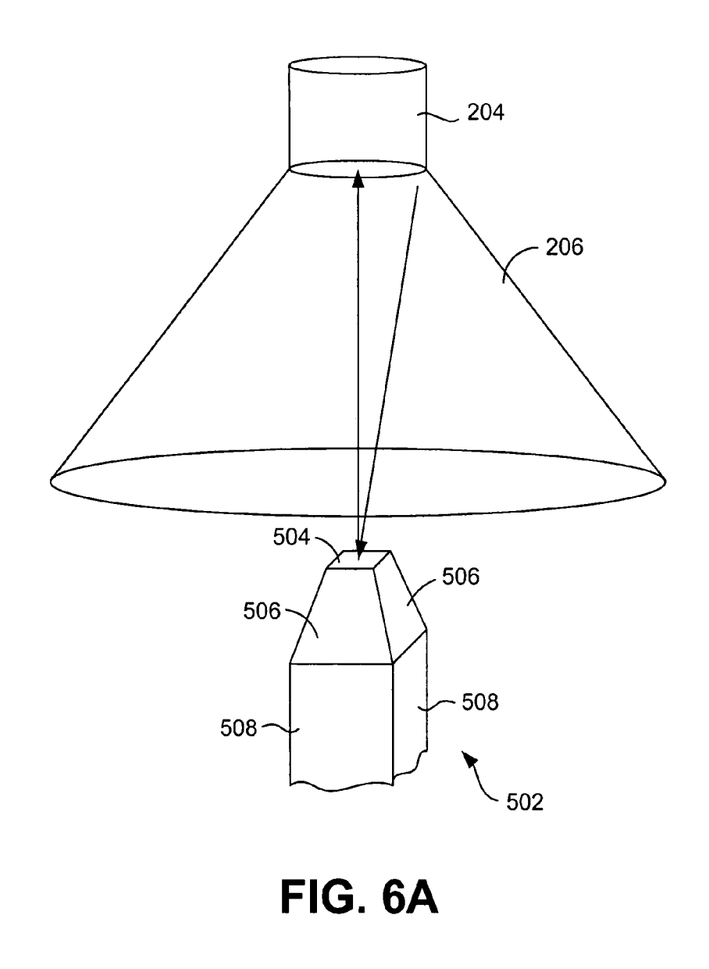
FIG. 6A is a schematic view of an embodiment of capturing an image of the flat end surface of the pin of FIG. 5.
Figure 6B:
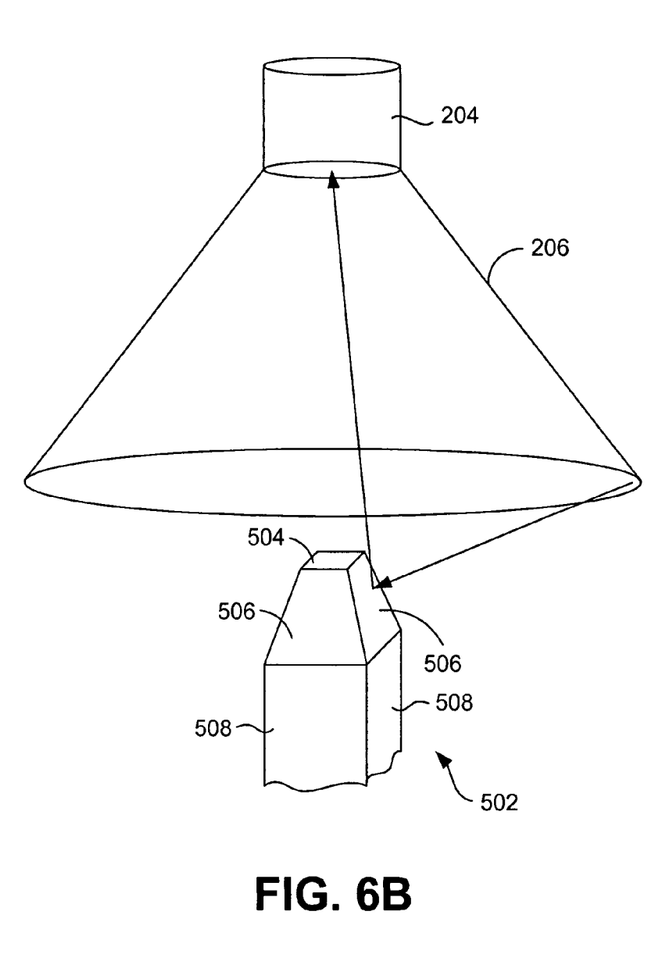
FIG. 6B is a schematic view of an embodiment of capturing an image of a chamfered surface of the pin of FIG. 5.

FIGS. 6A and 6B schematically depict illumination and image capture of the pin 502 shown in FIG. 5. In particular, FIG. 6A depicts illumination and image capture of the flat end surface 502, while FIG. 6B depicts illumination and image capture of one of the chamfered surfaces 506. Beginning with FIG. 6A, the pin 502 is illuminated using the first light source (see reference numeral 400 in FIG. 4) such that light is directed nearly perpendicular to the flat end surface 504. With such illumination, the light incident upon the flat end surface 504 is reflected directly back to the camera 204. However, due to the distinct orientations of the other surfaces of the pin 502, including the chamfered surfaces 506 and the lateral sides 508, the light reflected off of those surfaces is not directly reflected back to the camera 204. As a result of such illumination, the camera 204 primarily captures an image of the flat end surface 504 to the exclusion of the chamfered surfaces 506 and the lateral sides 508.

Referring next to FIG. 6B, the pin 502 is illuminated using the second light source (see reference numeral 402 in FIG. 4). In this case, the light incident upon the chamfered surfaces 506 is reflected back to the camera 204 while light incident upon the other pin surfaces, including the flat end surface 504 and lateral sides 508, is not. As a result, the camera 204 primarily captures an image of the chamfered surfaces 506 to the exclusion of the flat end surface 504 and the lateral sides 508.

Figure 7A:
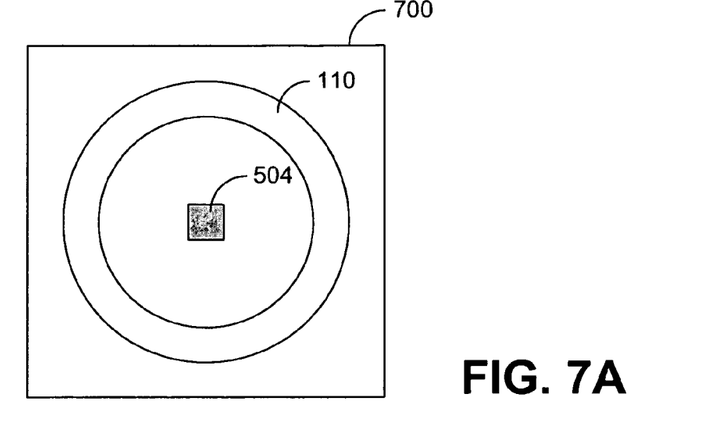
FIG. 7A is an example captured image of the flat end surface of the pin resulting from the illumination and capture depicted in FIG. 6A.
Figure 7B:
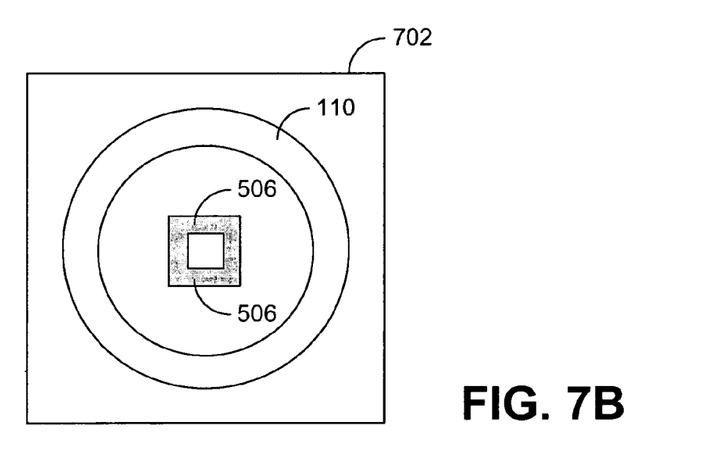
FIG. 7B is an example captured image of the chamfered surfaces of the pin resulting from the illumination and capture depicted in FIG. 6B.

FIGS. 7A and 7B illustrate captured images 700 and 702 that result from the nearly perpendicular and nearly parallel illumination and capture of FIGS. 6A and 6B, respectively. As is evident in FIG. 7A, the flat end surface 504 is prominently shown (identified with shading in FIG. 7A), while the other surfaces of the pin are not visible (or are far less prominent). In addition to the flat end surface 504, visible is the metal barrel 110 (FIG. 1) in which the pin is inserted. As shown in FIG. 7B, two chamfered surfaces 506 are prominent (identified with shading). Again, the metal barrel 110 in which the pin is inserted is visible. Once both images 700, 702 have been captured (e.g., sequentially), the two images may be combined to form a composite image 704 (FIG. 7C) that may be used to perform the press-fit connection analysis.

Figure 7C:
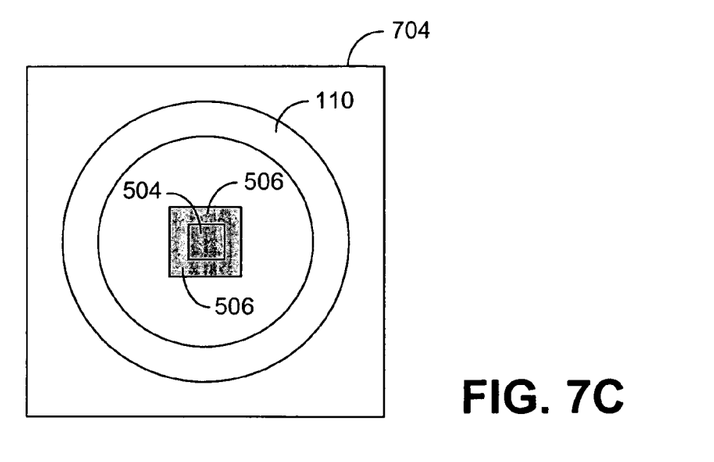
FIG. 7C is an example composite image comprising image data of the images of FIGS. 7A and 7B.
Figure 8A:
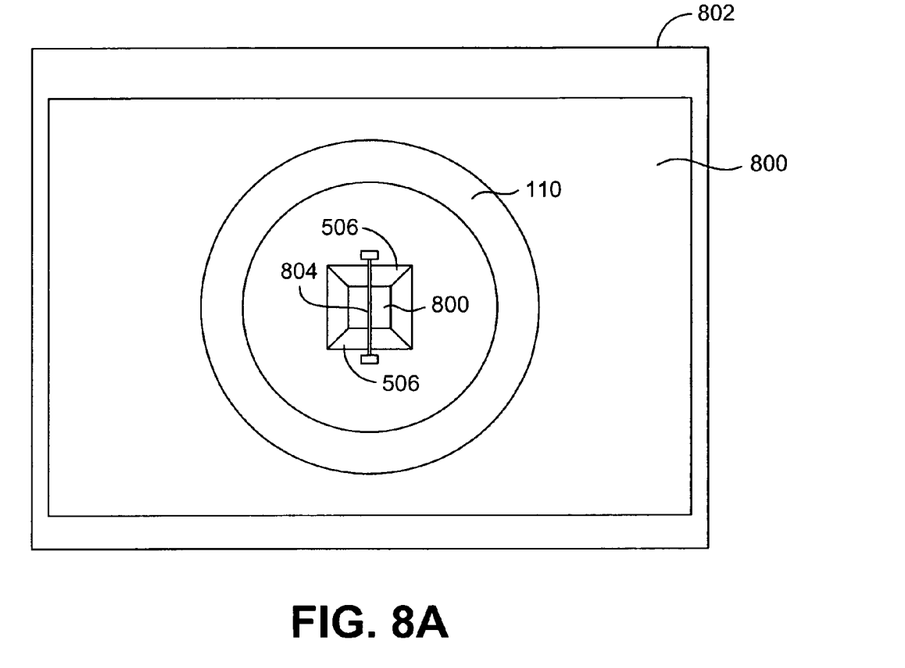
FIG. 8A illustrates an embodiment of defining an image analysis line for the composite image of FIG. 7C.
Figure 8B:
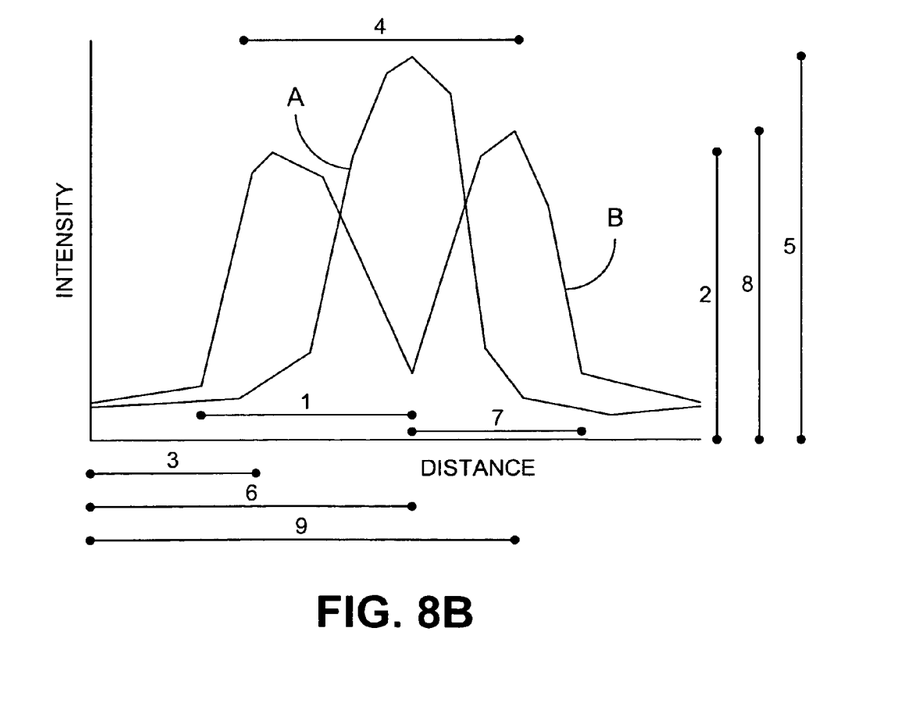
FIG. 8B provides plots of pixel intensity versus distance along the image analysis line shown in FIG. 8A.

FIGS. 8A and 8B illustrate analysis of a composite image such as that shown in FIG. 7C. As indicated in FIG. 8, the composite image 800 may be shown to the operator in a viewing window 802. Identified in the viewing window 802 is an image analysis line 804 that has been defined by the image analysis system 316 (FIG. 3). In the embodiment shown in FIG. 8A, the image analysis line 804 is vertical so as to cross two chamfered surfaces 506 (a "top" and a "bottom" chamfered surface in this case) and the flat end surface 504. However, the analysis line may be defined in any orientation in which two chamfered surfaces 506 and the flat end surface 504 are crossed. Notably, multiple analysis lines may be defined (e.g., a vertical and a horizontal line), if desired, so as to cross all chamfered surfaces 506 of a pin.

Before the image analysis line 804 can be defined by the image analysis system 316, the system must first identify the location of the pin tip. This is accomplished by first performing correlation pattern matching in which the image data contained in the composite image 800 is compared to image data of a reference pin. In particular, pattern matching searches are performed on the composite image 800 to identify a match with a predetermined model of a reference pin tip. Such pattern matching is known to persons having ordinary skill in the art.

Once the analysis line 804 has been defined, the image data (i.e., pixel data) along the line can be analyzed for the purpose of determining whether the press-fit connection of the pin is acceptable or unacceptable (i.e., defective). The analysis line 804 is defined relative to the composite image 800 instead of the separate images that the composite image comprises for purposes of conducting the analysis of both the flat end surface 504 and the chamfered surfaces 506 at the same time. Despite such simultaneous analysis of the composite image 800, the image analysis system 316 "knows" the origin of all image data that comprises the composite image and, therefore, can identify which data came from which image that was used to generate the composite image. Because of this fact, the image analysis system 316 can generate separate plots for both the image of the flat end surface 504 and the image of the chamfered surfaces 506 along the analysis line 804.

In the first stage of the press-fit connection analysis, the image analysis system 316 correlates pixel intensity with distance along the analysis line 804. For instance, the image analysis system 316 can plot two lines that represent the two channels of data that comprise the composite image 804 (i.e., the two images that were combined to form the composite image). FIG. 8B illustrates such plotting. As indicated in FIG. 8B, a first line A represents the pixel intensity along the analysis line 804 for the image captured of the flat end surface 504, and a second line B represents the pixel intensity along the analysis line for the image captured of the chamfered surfaces 504.

Using the data of the two plotted lines A and B, the image analysis system 316 can evaluate the characteristics of the captured pin tip and later make individual determinations as to each. By way of example, the following characteristics can be evaluated (i.e., measured) in relation to each pin feature:

Top chamfered surface:
   1. Surface length (top to bottom edge);
   2. Peak intensity;
   3. Peak intensity position;
Flat end surface:

4. Surface length (top to bottom edge);
5. Peak intensity;
6. Peak intensity position;

Bottom chamfered surface:
7. Surface length (top to bottom edge);
8. Peak intensity; and
9. Peak intensity position.

Each of those characteristics are identified by number in FIG. 8B. In addition to those characteristics, other characteristics may be identified including, for example, the surface width of each of the flat end surface 504 and both chamfered surfaces 506, by defining and analyzing further vertical and/or horizontal analysis lines. In addition or in exception, the system 316 may search for the flat end surface 504 in the image of the chamfered surfaces 506 and/or the chamfered surfaces in the image of the flat end surface to confirm their absence from those images.

Once the various characteristics have been identified, a final determination is made as to the press-fit connection. Specifically, a final decision is made as to whether the press-fit connection under inspection is acceptable or unacceptable (i.e., defective). Various decision making rules may be employed in making the final decision. With such rules, the measured characteristics of the pin tip can be compared with various reference values and/or with each other to determine, as to each characteristic, whether the characteristics indicate that the press-fit connection is or is not acceptable. By way of example, these rules may comprise:

1. Flat end surface length<$V1$;
2. Flat end surface width<$V2$;
3. Flat end surface peak intensity>$V3$;
4. Top chamfered surface length<$V4$;
5. Top chamfered surface width<$V5$;
6. Top chamfered peak intensity>$V6$;
7. Top chamfered surface peak intensity position<flat end surface peak intensity position;
8. Bottom chamfered surface length<$V7$;
9. Bottom chamfered surface width<$V8$;
10. Bottom chamfered peak intensity>$V9$; and
11. Bottom chamfered surface peak intensity position<flat end surface peak intensity position;

where $V_n$ is a reference value stored in memory.

Through application of the decision making rules to the collected data, the image analysis system 316 determines which of the rules is/are satisfied and which of the rule is/are violated. The final decision is then made in view of those results. Notably, not all of the rules must be satisfied for the image analysis system 316 to determine that the press-fit connection is acceptable. Moreover, violation of a single rule in spite of satisfaction of all others may indicate an unacceptable press-fit connection. Therefore, different weight can be applied to the rules so that more important characteristics (i.e., those most indicative of whether the press-fit connection is or is not acceptable) can be given more weight in the final decision than less important characteristics. For instance, if Rule 1 is not satisfied, it is unlikely that the press-fit connection is acceptable (i.e., not defective). Therefore, the system 316 may be configured to return an "unacceptable" press-fit connection if Rule 1 is violated.

Once the final decision has been made, it can be presented to the system operator and, if any defects have been detected, appropriate measures can be taken to remedy the problem.

Figure 9A:
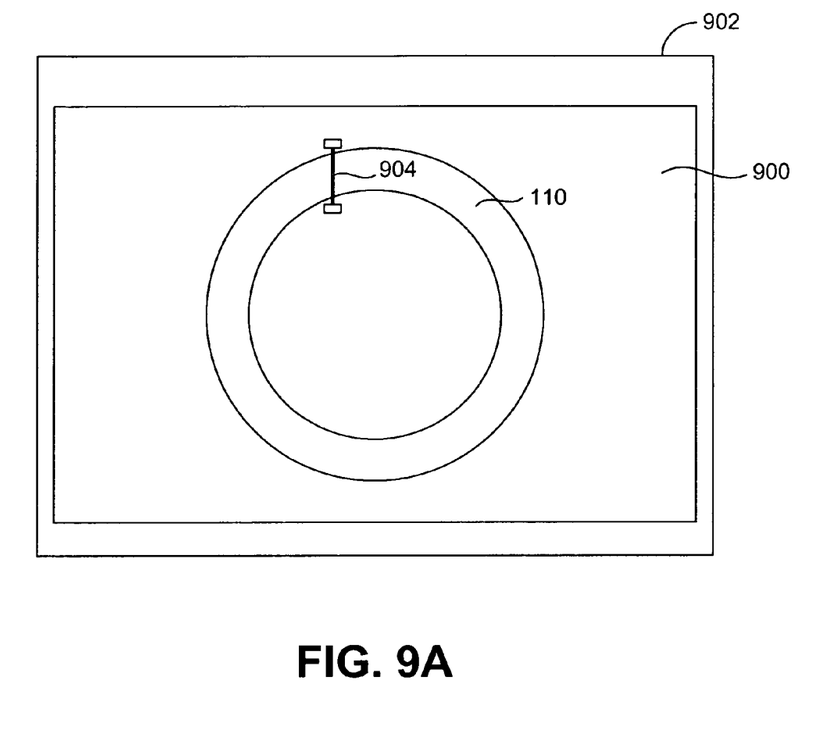
FIG. 9A illustrates an embodiment of defining an image analysis line for a first defective press-fit connection.
Figure 9B:
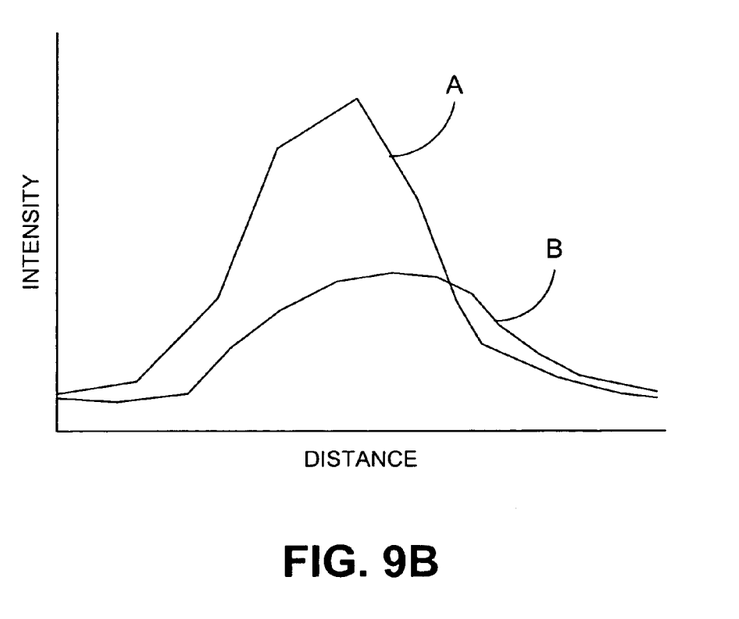
FIG. 9B provides plots of pixel intensity versus distance along the image analysis line shown in FIG. 9A.

FIGS. 9A-9B and FIGS. 10A-10B provide examples of failing cases, i.e., situations in which a defective press-fit connection is determined. Beginning with FIG. 9A, shown is a composite image 900 in a viewing window 902 of a metal barrel 110 in which no pin has been inserted, for instance due to misalignment of the pin and the barrel during pin installation. In such a case, the image analysis system 316 will not be able to identify an actual pin tip to analyze. Instead, however, the system 316 may identify the barrel 110 as comprising a possible candidate for a pin tip. Accordingly, the system 316 may define an image analysis line 904 that crosses the barrel 110 (the identified "pin tip"). FIG. 9B illustrates two plotted lines A and B representing the two channels of data along the analysis line 904 that comprise the composite image 900. As indicated in FIG. 9B, the two lines A and B are highly distinct from the lines A and B of the properly-installed pin shown in FIG. 8B. Accordingly, analysis of the data that comprises the lines A and B of FIG. 9B will result in a failure determination for the press-fit connection when the aforementioned rules are applied.

Figure 10A:
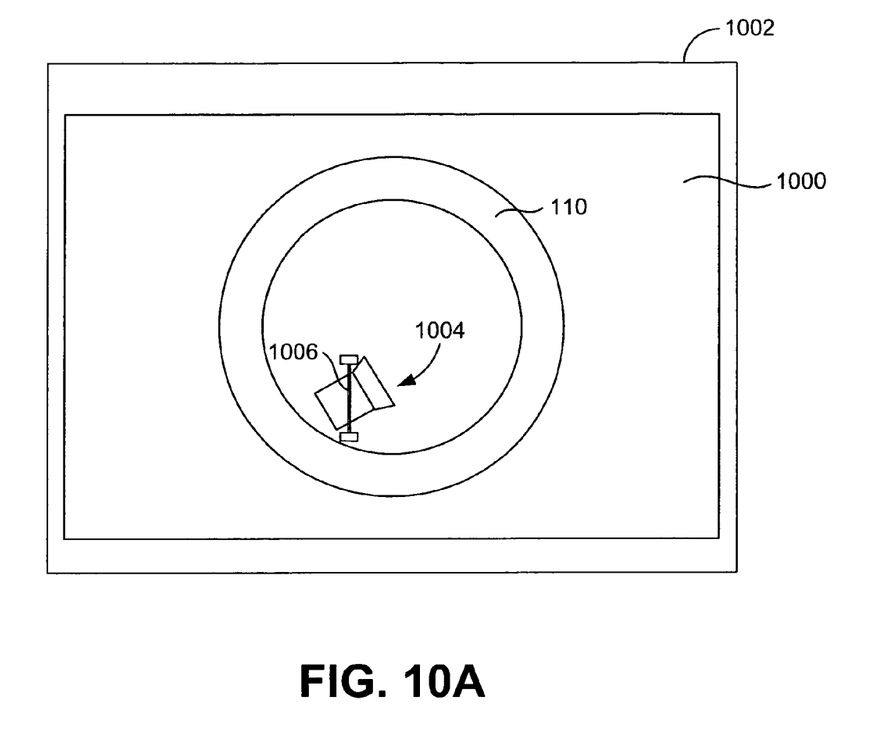
FIG. 10A illustrates an embodiment of defining an image analysis line for a second defective press-fit connection.
Figure 10B:
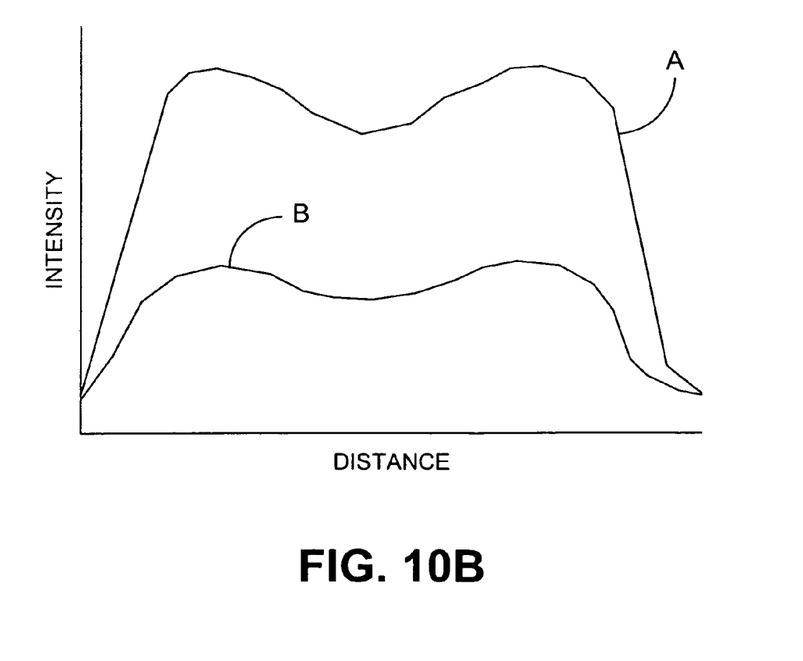
FIG. 10B provides plots of pixel intensity versus distance along the image analysis line shown in FIG. 10A.

FIG. 10A shows a composite image 1000 in a viewing window 1002 of an improperly installed pin 1004 within a barrel 110. In this case, the image analysis system 316 has established an image analysis line 1006 that crosses the tip of the improperly installed pin 1004. The plots that result from this analysis line 1006 are shown in FIG. 10B. As indicated in that figure, the plots A and B, representing the two channels of data, are again highly distinct from the lines A and B of FIG. 8B. Accordingly, analysis of the data that comprises the lines A and B of FIG. 10B will again result in a failure determination for the press-fit connection when the aforementioned rules are applied.

Figure 11:
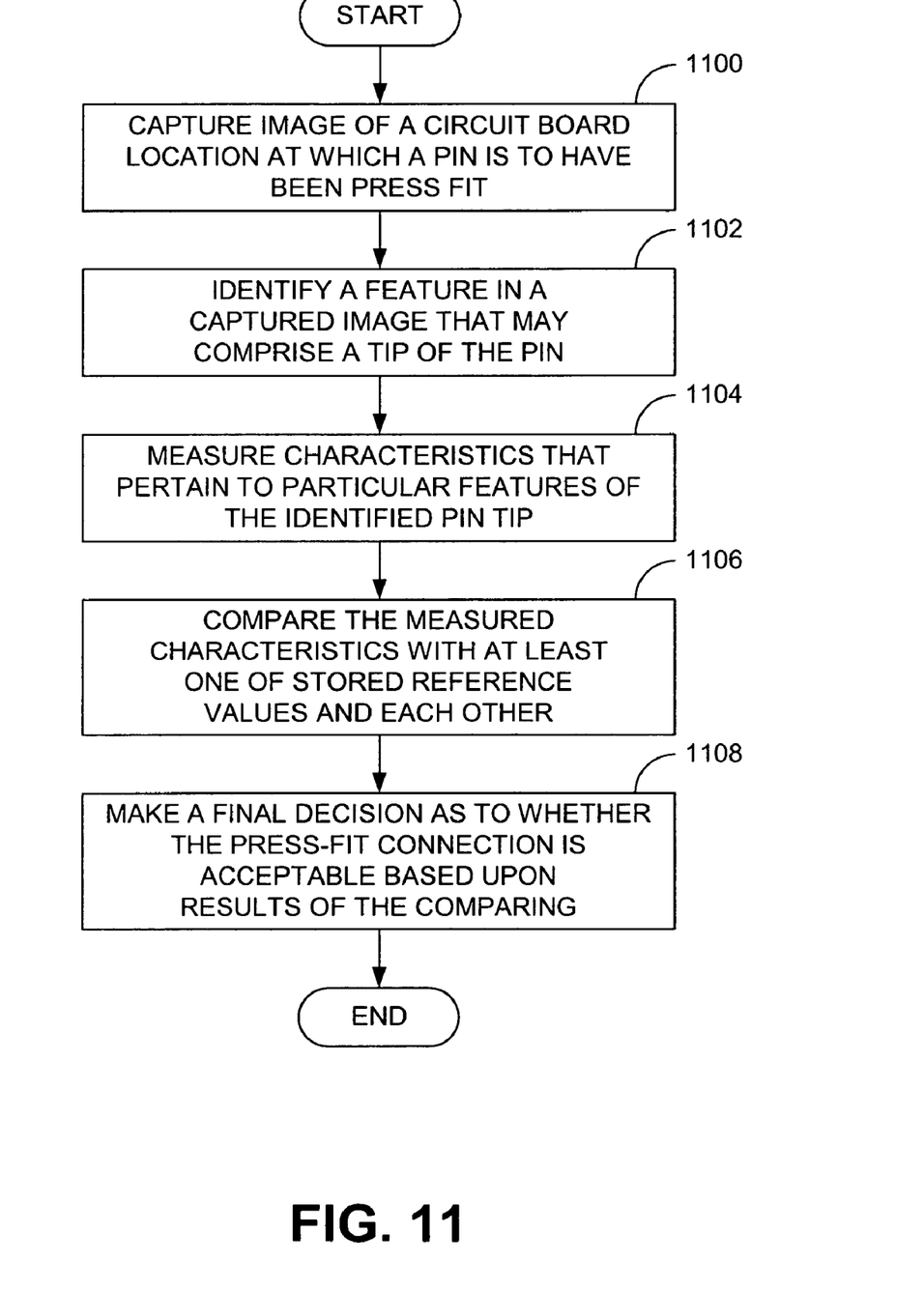
FIG. 11 is a flow diagram of an embodiment of a method for inspecting a press-fit connection.

In view of the foregoing, a method for inspecting a press-fit connection can be described as provided in the flow diagram of FIG. 11. As indicated in that figure, the method comprises capturing an image of a circuit board location at which a pin is to have been press-fit (block 1100), identifying a feature in a captured image that may comprise a tip of the pin (block 1102), measuring characteristics that pertain to particular features of the identified pin tip (block 1104), comparing the measured characteristics with at least one of stored reference values and each other (block 1106), and making a final decision as to whether the press-fit connection is acceptable based upon results of the comparing (block 1108).

Figure 12:
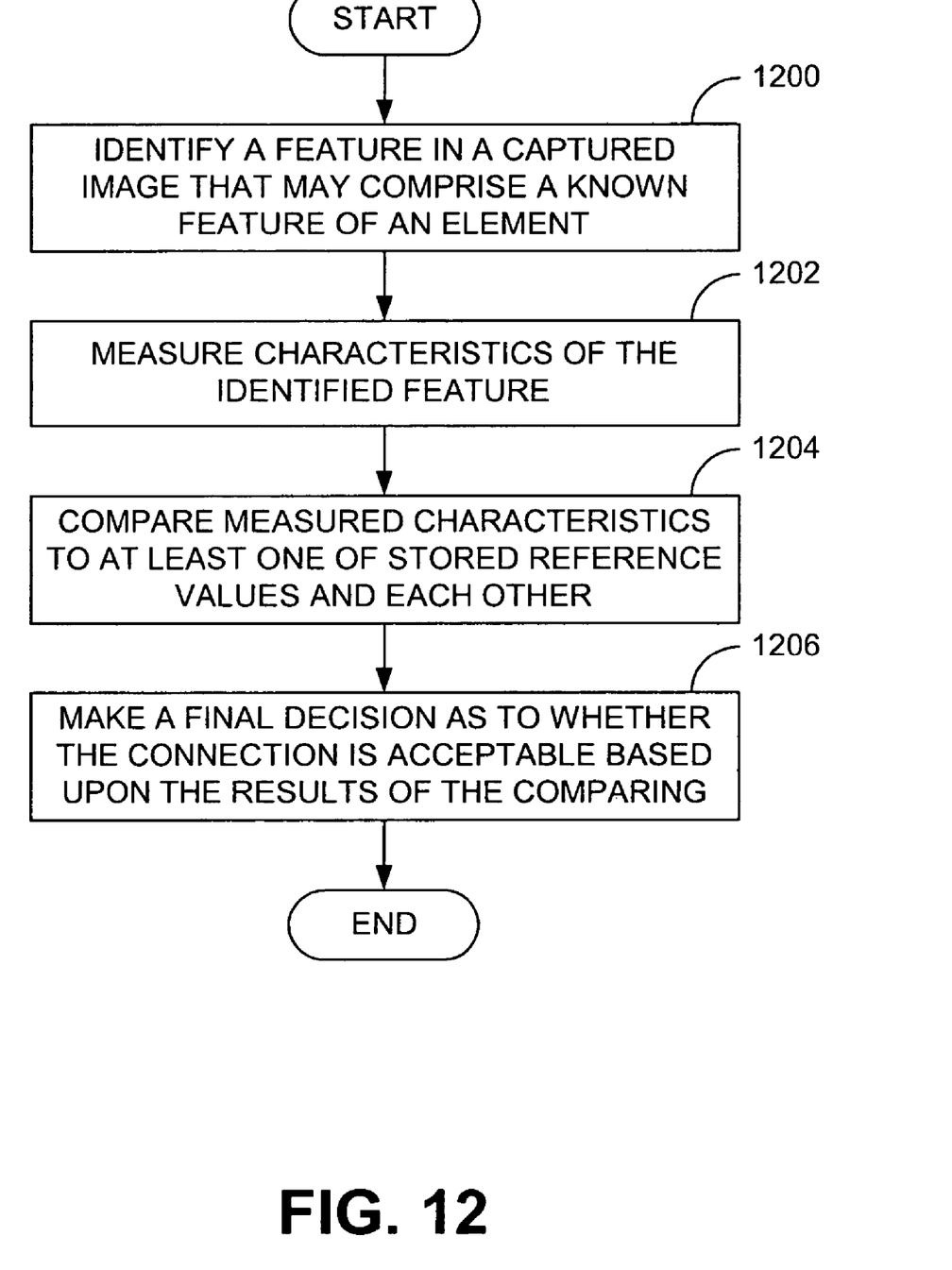
FIG. 12 is a flow diagram of an embodiment of a method for inspecting connection of an element to a circuit board.

A method for inspecting connection of an element to a circuit board can be described as provided in the flow diagram of FIG. 12. As indicated in that figure, the method comprises identifying a feature in a captured image that may comprise a known feature of the element (block 1200), measuring characteristics of the identified feature (block 1202), comparing the measured characteristics with at least one of stored reference values and each other (block 1204), and making a final decision as to whether the connection is acceptable based upon results of the comparing (block 1206).

What is claimed is:
1. A method for inspecting a press-fit connection, the method comprising:
   capturing an image of a circuit board location at which a pin is to have been press-fit;
   identifying a feature in a captured image that may comprise a tip of the pin;
   measuring characteristics of particular features on the identified pin tip;
   comparing the measured characteristics with at least one of stored reference values and each other; and making a final decision as to whether the press-fit connection is acceptable based upon results of the comparing.

2. The method of claim 1, wherein capturing an image comprises capturing an image of a flat end surface of the pin tip and separately capturing an image of at least one chamfered surface of the pin tip.

3. The method of claim 2, further comprising forming a composite image that comprises data from the captured image of the flat end surface and the captured image of the at least one chamfered surface.

4. The method of claim 2, wherein capturing an image of the flat end surface comprises illuminating the pin with light that is emitted nearly perpendicular to the circuit board and capturing an image of the at least one chamfered surface comprises illuminating the pin with light that is emitted nearly parallel to the circuit board.

5. The method of claim 4, wherein illuminating the pin with light that is emitted nearly perpendicular comprises emitting light at an angle of approximately 70 degrees away from a plane that is parallel with a plane of the circuit board.

6. The method of claim 4, wherein illuminating the pin with light that is emitted nearly parallel comprises emitting light at an angle of approximately 15 degrees away from a plane that is parallel with a plane of the circuit board.

7. The method of claim 1, wherein identifying a feature in a captured image comprises performing correlation pattern matching to identify a match in the captured image with a pin tip model.

8. The method of claim 1, wherein measuring characteristics comprises defining an image analysis line that crosses the pin tip and measuring pixel intensity along the length of the defined line.

9. The method of claim 1, wherein measuring characteristics comprises measuring a dimension of at least one of a flat end surface and a chamfered surface of the pin tip.

10. The method of claim 1, wherein measuring characteristics comprises measuring a peak pixel intensity of at least one of a flat end surface and a chamfered surface of the pin tip.

11. The method of claim 1, wherein measuring characteristics comprises measuring a position at which a peak pixel intensity occurs for at least one of a flat end surface and a chamfered surface of the pin tip.

12. The method of claim 1, wherein comparing the measured characteristics comprises comparing a dimension of at least one of a flat end surface and a chamfered surface of the pin tip with a reference value.

13. The method of claim 1, wherein comparing the measured characteristics comprises comparing a peak pixel intensity of at least one of a flat end surface and a chamfered surface of the pin tip with a reference value.

14. The method of claim 1, wherein comparing the measured characteristics comprises comparing a position of a peak pixel intensity of a chamfered surface of the pin tip with a position of a peak pixel intensity of a flat end surface of the pin tip.

15. The method of claim 1, wherein making a final decision comprises weighting the results so that the results that are most highly indicative of whether the press-fit connection is or is not acceptable is given greater weight that other results.

16. A system for inspecting a press-fit connection, the system comprising:
means for illuminating a pin tip from two distinct directions, a first direction suited to illuminate a flat end surface of the pin tip and a second direction suited to illuminate at least one chamfered surface of the pin tip;
means for capturing a first image while the pin tip is illuminated with light from the first direction and a second image while the pin is illuminated with light from the second direction;
means for measuring characteristics from image data of the captured images of a flat end surface and at least one chamfered surface of the pin tip; and
means for comparing the measured characteristics with at least one of stored reference values and each other.

17. The system of claim 16, wherein the means for illuminating comprise a lighting head that is adapted to emit light in a direction nearly perpendicular to a plane of a circuit board in which the pin is inserted and a direction nearly parallel to the plane of the circuit board.

18. The system of claim 16, wherein the means for capturing comprise a two-dimensional camera.

19. The system of claim 16, wherein the means for measuring comprise an image analysis system that is configured to define an image analysis line that crosses the pin tip and that measures pixel intensity along the length of the defined line.

20. The system of claim 19, wherein the image analysis system is configured to measure a dimension of at least one of the flat end surface and the at least one chamfered surface.

21. The system of claim 16, wherein the means for comparing comprise an image analysis system that is configured to compare a dimension of at least one of the flat end surface and the at least one chamfered surface with a reference value.

22. The system of claim 16, wherein the means for comparing comprise an image analysis system that is configured to compare a peak pixel intensity of at least one of the flat end surface and the chamfered surface with a reference value.

23. The system of claim 16, wherein the means for comparing comprise an image analysis system that is configured to compare a position of a peak pixel intensity of a chamfered surface with a position of a peak pixel intensity of the flat end surface.

24. The system of claim 16, further comprising means for identifying the pin tip in a composite image formed from the first and second images.

25. The system of claim 16, further comprising means for making a final decision as to whether the press-fit connection is acceptable based upon results obtained by comparing the measured characteristics with at least one of stored reference values and each other.

26. A computer-readable medium embedded with a computer program, comprising:
logic configured to identify a tip of a pin that has been press fit into a circuit board;
logic configured to measure characteristics of a flat end surface and a chamfered surface of an identified pin tip;
logic configured to compare measured characteristics with at least one of stored reference values and each other; and
logic configured to make a final decision as to whether the pin is properly installed based upon results of the comparing performed by the logic configured to compare.

27. The computer-readable medium of claim 26, wherein the logic configured to identify a tip of a pin comprises logic configured to perform correlation pattern matching to identify a match in the image with a pin tip model.

28. The computer-readable medium of claim 26, wherein the logic configured to measure characteristics comprises logic configured to define an image analysis line that crosses the pin tip and to measure pixel intensity along the length of the defined line.

29. The computer-readable medium of claim 26, wherein the logic configured to measure characteristics comprises logic configured to measure dimensions of the flat end surface and the chamfered surface.

30. The computer-readable medium of claim 26, wherein the logic configured to measure characteristics comprises logic configured to measure peak pixel intensities of the flat end surface and the chamfered surface.

31. The computer-readable medium of claim 26, wherein the logic configured to measure characteristics comprises logic configured to measure positions at which a peak pixel intensities occur for the flat end surface and the chamfered surface.

32. The computer-readable medium of claim 26, wherein the logic configured to compare measured characteristics comprises logic configured to compare dimensions of the flat end surface and the chamfered surface with reference values.

33. The computer-readable medium of claim 26, wherein the logic configured to compare measured characteristics comprises logic configured to compare peak pixel intensities of the flat end surface and the chamfered surface with reference values.

34. The computer-readable medium of claim 26, wherein the logic configured to compare the measured characteristics comprises logic configured to compare a position of a peak pixel intensity of the flat end surface with a position of a peak pixel intensity of the chamfered surface.

35. The computer-readable medium of claim 26, wherein the logic configured to make a final decision comprises logic configured to weigh comparison results so that the results that are most highly indicative of whether the pin is or is not properly installed is given greater weight than other results.

36. A system for inspecting a press-fit connection, the system comprising:

a camera adapted to capture images of a circuit board to be inspected;

a lighting head that is adapted to emit light in a direction nearly perpendicular to the circuit board and in a direction nearly parallel to the circuit board; and an image analysis system configured to identify a tip of a pin that has been press fit into the circuit board, to measure characteristics of a flat end surface and of a chamfered surface on the identified pin tip, to compare the measured characteristics with at least one of stored reference values and each other, and to make a final decision as to whether the pin is properly installed based upon results of the comparing.

37. The system of claim 36, wherein the camera is a charge-coupled device.

38. The system of claim 36, wherein the lighting head emits light at an angle of approximately 70 degrees relative to a plane parallel to a plane of the circuit board and an angle of approximately 15 degrees relative to another plan parallel to the plane of the circuit board.

39. The system of claim 36, wherein the image analysis system is configured to measure at least one of dimensions of the flat end surface and the chamfered surface, peak pixel intensities of the flat end surface and the chamfered surface, and positions at which a peak pixel intensities occur for the flat end surface and the chamfered surface.

40. The system of claim 36, wherein the image analysis system is configured to compare at least one of dimensions of the flat end surface and the chamfered surface, peak pixel intensities of the flat end surface and the chamfered surface with reference values, and positions of peak pixel intensities of the flat end surface and the chamfered surface with reference values.

41. The system of claim 36, wherein the image analysis system is configured to compare a position of a peak pixel intensity of the flat end surface with a position of a peak pixel intensity of the chamfered surface.

* * * * *

UNITED STATES PATENT AND TRADEMARK OFFICE
CERTIFICATE OF CORRECTION

PATENT NO. : 7,324,685 B2 Page 1 of 1
APPLICATION NO. : 10/689410
DATED : January 29, 2008
INVENTOR(S) : Jose M. Mejias Miranda It is certified that error appears in the above-identified patent and that said Letters Patent is hereby corrected as shown below:

In column 9, line 62, in Claim 15, delete "that" and insert -- than --, therefor.

In column 12, line 19, in Claim 38, delete "plan" and insert -- plane --, therefor.

Signed and Sealed this

Twenty-eighth Day of October, 2008

JON W. DUDAS
*Director of the United States Patent and Trademark Office*